(12) United States Patent
Howell

(10) Patent No.: US 10,726,358 B2
(45) Date of Patent: Jul. 28, 2020

(54) IDENTIFICATION OF INDIVIDUALS AND/OR TIMES USING IMAGE ANALYSIS

(71) Applicant: SweatWorks, LLC, Arlington, VA (US)

(72) Inventor: Nick Howell, Beaverton, OR (US)

(73) Assignee: SweatWorks, LLC, Arlington, VA (US)

(*) Notice: Subject to any disclaimer, the term of this patent is extended or adjusted under 35 U.S.C. 154(b) by 503 days.

(21) Appl. No.: 15/419,453

(22) Filed: Jan. 30, 2017

(65) Prior Publication Data

US 2017/0236029 A1    Aug. 17, 2017

Related U.S. Application Data

(60) Provisional application No. 62/289,829, filed on Feb. 1, 2016.

(51) Int. Cl.
| | |
|---|---|
| *G06N 20/00* | (2019.01) |
| *G06K 9/00* | (2006.01) |
| *G06K 9/46* | (2006.01) |
| *G06K 9/62* | (2006.01) |
| *G06K 9/18* | (2006.01) |

(52) U.S. Cl.
CPC ......... *G06N 20/00* (2019.01); *G06K 9/00624* (2013.01); *G06K 9/46* (2013.01); *G06K 9/627* (2013.01); *G06K 9/00221* (2013.01); *G06K 9/00744* (2013.01); *G06K 9/183* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 2004/0075752 A1* | 4/2004 | Valleriano | H04N 5/772 348/231.3 |
| 2004/0100566 A1* | 5/2004 | Valleriano | G07C 1/22 348/231.99 |
| 2014/0226855 A1* | 8/2014 | Savvides | G06K 9/00771 382/103 |
| 2015/0149837 A1* | 5/2015 | Alonso | G06K 7/10227 714/57 |
| 2016/0035143 A1* | 2/2016 | Hansen | H04N 1/00342 348/157 |
| 2016/0379091 A1* | 12/2016 | Lin | G06K 9/00724 382/156 |
| 2017/0238055 A1* | 8/2017 | Chang | G06F 3/012 725/19 |
| 2019/0050635 A1* | 2/2019 | Hohteri | G06K 9/00624 |

* cited by examiner

*Primary Examiner* — Fayyaz Alam
(74) *Attorney, Agent, or Firm* — Hamilton, Brook, Smith & Reynolds, P.C.

(57) ABSTRACT

The present disclosure provides a method for training a machine learning software component. In a computing system, a plurality of images and a plurality of location tuples are received. Each of the location tuples includes a subject identifier and a temporal identifier. For each of the location tuples, the subject identifier is associated with an image of the plurality of images using the temporal identifier to form a training data set. The machine learning software component is trained with the training data set.

14 Claims, 13 Drawing Sheets

IDENTIFICATION OF INDIVIDUALS AND/OR TIMES USING IMAGE ANALYSIS

RELATED APPLICATION

This application claims the benefit of U.S. Provisional Application No. 62/289,829, filed on Feb. 1, 2016. The entire teachings of the above application are incorporated herein by reference.

TECHNICAL FIELD

The present disclosure relates to analyzing images. Particular embodiments relate to identifying an individual depicted in an image. Further embodiments relate to extracting temporal information from one or more images, such as a time an individual passed a particular location.

BACKGROUND

In many contexts, it can be of interest to identify when an individual passed a particular location. For example, finish times in races are determined by when an individual crossed a finish line. Prior methods of determining finish times, such as by using manual timing devices (e.g., a stopwatch) or RFID technology, can suffer from disadvantages, including difficulty in scaling for large events or expense.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present disclosure provides a method of training a machine learning software component, such as an artificial neural network. A computing system receives a plurality of images and a plurality of location tuples associated with the plurality of images. Each of the location tuples includes a subject identifier and a temporal identifier. The temporal identifiers are used to associate images of the plurality of images with subject identifiers. The images and their associated subject identifiers form a training data set. The machine learning software component is trained with the training data set. Once trained, the machine learning software component can be used to identify individuals in images obtained proximate a particular location, such as a finish line of a race course. Temporal information associated with the images can be used to determine when the individual was proximate the particular location. Thus, the method may be used in place of other timing techniques, such as manual timing (for example, with a stopwatch) or using RFID technology.

In another embodiment, the present disclosure provides a method of determining a time an individual was located proximate a particular location, such as the finish line of a race course, by analyzing an image using a machine learning software component. A computing system analyzes an image of an individual passing a particular location, such as a location on a race course, with a machine learning software component to provide at least one subject identifier. From the image, the computer system determines a time an individual associated with the at least one subject identifier passed the particular location. The method may be used in place of other timing techniques, such as manual timing (for example, with a stopwatch) or using RFID technology.

The present disclosure, in a further embodiment, provides a method for identifying an individual in an image, such as an image taken during a race. In a computing system, an image recognition component is used to analyze the image and determine a plurality of candidate subject identifiers associated with the image. The candidate subject identifiers are ranked using one or more supplemental scoring parameters, such as parameters based on performance data associated with the candidate subject identifiers or visually distinct features associated with the candidate subject identifiers. The use of supplemental scoring parameters can assist in correctly associating an image with a subject identifier associated with an individual depicted in the image. If desired, data associated with the image can be used to determine when the individual depicted in the image passed a particular location, such as the finish line of a race course.

In another embodiment, the present disclosure provides a method for determining when an individual was located proximate a particular location by analyzing a plurality of images depicting the individual. In a computing system implementing an image analysis component, an image feature of an individual is extracted from each of a plurality of images depicting the individual. Sizes of the extracted image features are determined. A size rule is applied to select an image of the plurality of images representing when the individual was proximate the particular location. If desired, data associated with the image can be used to determine when the individual depicted in the image passed the particular location, such as a time the individual crossed the finish line of a race course.

According to a further embodiment, a method is disclosed of providing information regarding an individual depicted in an image. At a remote computing system, an image depicting an individual is received over a network from a mobile computing device. The individual is identified using an image recognition component. Data associated with the individual is retrieved from a database and sent over the network to the mobile computing device.

In another embodiment of a method of providing information regarding an individual depicted in an image, an image of an individual is recorded using a mobile computing device. The image is sent to a remote computing system over a network. The mobile computing device, over the network, receives data related to the individual. The mobile computing device presents the data to a user.

The foregoing and other objects, features, and advantages of the present disclosure will become more apparent from the following detailed description, which proceeds with reference to the accompanying figures.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
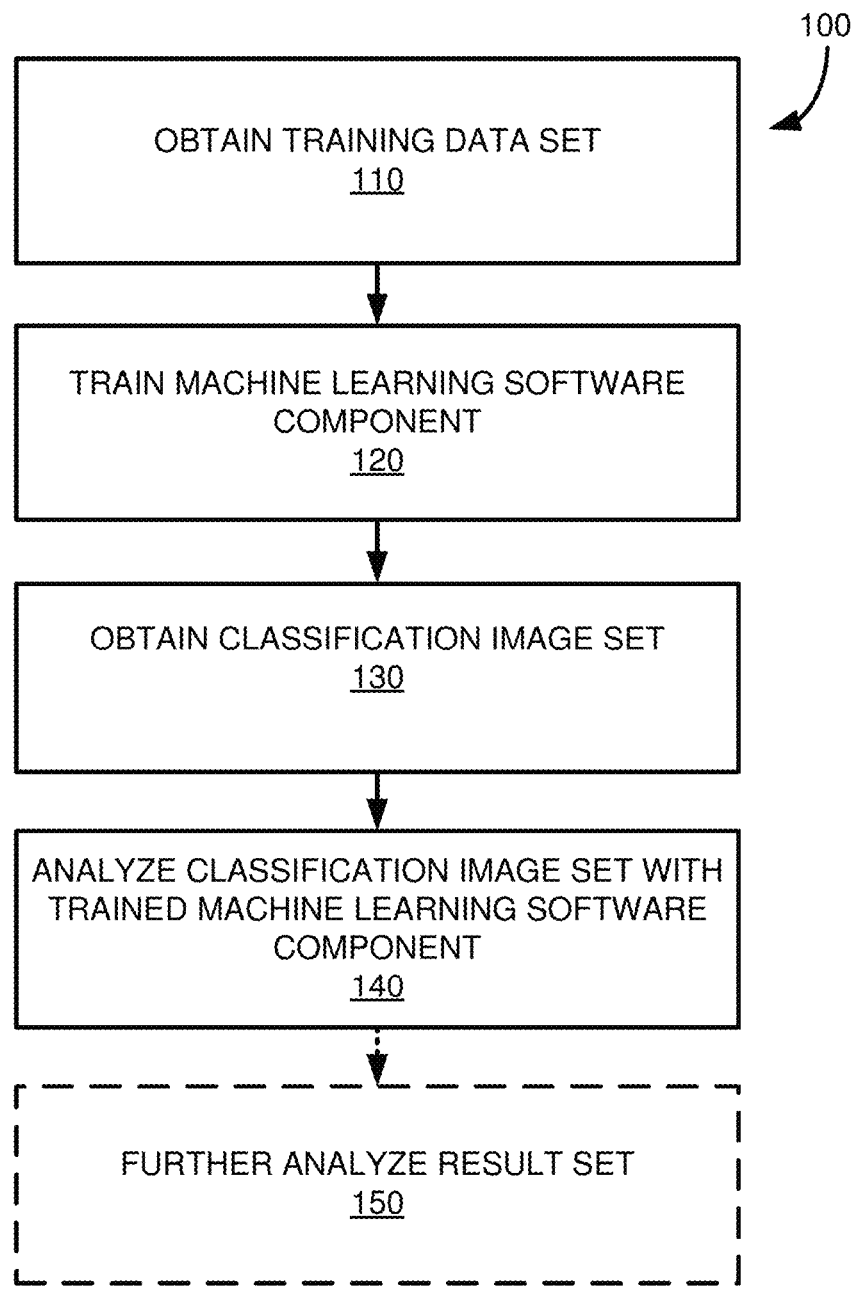
FIG. 1 is a flowchart of a method according to an embodiment of the present disclosure for training a machine learning software component and using the trained machine learning software component to identify an individual in an image.

A description of example embodiments of the invention follows.

The teachings of all patents, published applications and references cited herein are incorporated by reference in their entirety.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises."

Depending on context, a given component or module may accept a different type of information as input and/or produce a different type of information as output. More generally, various alternatives to the examples described herein are possible. For example, some of the methods described herein can be altered by changing the ordering of the method acts described, or by splitting, repeating, or omitting certain method acts. The various aspects of the disclosed technology can be used in combination or separately. Different embodiments use one or more of the described innovations.

Example 1—Training Machine Learning Software Component Using Temporally-Correlated Images Certain activities, such as sporting events, involve determining when an individual passed a particular location. For example, in a running event, the time an individual crossed a finish line is typically determined, such as to determine a winner of an event, or to provide finish times to race participants or other interested parties. As another example, in many running events, photographers are located on the course to take photographs of participants at various locations. The photographs can then be made available to the participants, including for purchase. In order to organize the photographs, it can be useful to correlate a particular image with one or more individuals in the image, such as an individual most prominently shown in the image.

Various methods have been employed to time races and similar events. For example, race times can be manually recorded, such as using a timepiece, like a stopwatch, and manually correlated to the identity of an individual crossing the finish line. Photographic and video techniques have also been used to help determine race finish times. For example, photo-finish cameras can employ strip photography, which can be particularly useful when multiple individuals cross the finish line in close proximity. However, these photographic and video techniques typically suffer from the drawback of having to manually identify subjects in the photographs or video. This can be particularly cumbersome for events with large numbers of participants. For example, in 2014, the New York City Marathon had 50,386 finishers.

Radio-frequency identification (RFID) technology has been used to try to overcome some of the disadvantages noted above. Typically, a RFID tag is physically associated with an individual, such as being affixed to the individual's shoe, associated with a bib or similar identifying device, or worn about the individual's wrist or ankle in the form of a bracelet. Each RFID tag has a unique frequency that can be associated with a particular individual. When the frequency is detected by a receiver placed proximate a particular location, such as a finish line, the individual can be determined to have passed by the location, for example, crossing a finish line, at a particular time.

Although RFID techniques can be useful in identifying individuals passing a particular location, they can suffer from various drawbacks. For example, RFID systems can involve the use of potentially expensive detection equipment at each location where individuals are to be detected. In addition, RFID techniques require each participant to manually affix an RFID tag. Thus, events with a high number of participants may require a large number of RFID tags. If the tags are not reused, the RFID systems can be more expensive to use. However, if the tags are reused, in addition to being manually affixed to a participant, they must also be manually collected at the end of the event. RFID systems can also be susceptible to radio interference, which can reduce their accuracy and cause them to suffer from a lack of precision (e.g., when a large number of participants are clustered together).

According to one embodiment of the present disclosure, a photographic or video method is provided that allows the time an individual was located proximate a particular location, such as a location on a race course, to be determined.

In a particular example, the method is used to determine the time an individual crossed a finish line of a race course.

FIG. 1 presents flowchart of a method 100 according to this Example 1 for identifying an individual in a photograph or video. Throughout this disclosure, a photograph or a video frame may be referred to as an "image." In step 110, a training data set is obtained. The training data set includes a plurality of images of one or more individuals. The images may be associated with a temporal sequence, such as a time. The training data set also includes a subject identifier, such as a name, numerical identifier, or other unique identifier, for one or more particular individuals who are depicted in the images and who are to be identified in a classification image set. Each subject identifier is associated with a temporal identifier, such as a time, in a location tuple.

The temporal identifier may be used to identify one or more of the plurality of images in which the individual associated with the corresponding subject identifier appears. In some cases, the temporal sequence of the images has a common basis with the temporal identifier. For example, a temporal identifier may indicate that an individual $S_1$ crossed a race finish line at a time $T_1$. If the images in the training data set have a common basis with the temporal identifier, then an image associated with time $T_1$ includes an element depicting subject $S_1$. In other cases the temporal sequence of images and the temporal identifier do not share a common basis. For example, the image basis and temporal identifier basis may be offset, such as by a consistent amount or a varying amount.

The image basis and the temporal identifier basis are typically correlated such that the temporal identifier associated with $S_1$ can be associated with the appropriate image of the training data set. For example, if the image basis and temporal identifier basis are offset by a consistent amount, $\Delta t$, a subject $S_1$ having a time identifier $TI_1$ may be associated with an image having image time $IT_1 = TI_1 - \Delta t$.

The time identifier values may be obtained by any suitable method. In various implementations, the time identifier values are obtained using a timing device, such as a stopwatch, RFID tracking, or manual viewing of photographic or video images. According to a particular implementation, images, subject identifiers, and temporal identifiers are obtained by associating images of an event with timing data associated with the event. For example, images of individuals passing a particular location on a race course may be combined with RFID timing data associated with the individuals crossing the particular location. In other implementations, the time identifier values are obtained in another way.

In some aspects, the training data set includes other types of training information, instead of, or in addition to, training data produced by associating an image with a subject identifier using a temporal identifier. For instance, the images in the training data set may be associated with the subject identifier in another manner. In one example, images of individuals may be obtained and associated with subject identifiers when individuals register for an event.

In step 120, the training data set is used to train a machine learning software component. The machine learning software component can employ any suitable machine learning technique useable in image recognition. Suitable machine learning techniques include decision trees, artificial neural networks, instance-based learning, Bayesian methods, reinforcement learning, inductive logic programming, genetic algorithms, support vector machines, or combinations thereof.

The machine learning technique employed by the machine learning software component can include a facial recognition component. The facial recognition component can implement any suitable facial recognition algorithm. Suitable facial recognition algorithms include those that incorporate principal component analysis (PCA), including PCA using Eigenfaces, Eigenfeatures, linear discriminate analysis, independent component analysis, elastic bunch graph matching, such as using the Fisherface algorithm, dynamic link matching, multilinear subspace learning, such as using a tensor representation, evolutionary pursuit, fiducial point analysis, Kernel methods, hidden Markov models, boosting and ensemble solutions, or combinations thereof. Suitable platforms for implementing the machine learning software component include the TENSORFLOW library (Google Inc., Mountain View, Calif.), MATLAB (MathWorks, Inc., Natick, Mass.), and OpenFace (Carnegie Mellon University, Pittsburgh, Pa.).

Other types of image recognition techniques may be used instead of, or in combination with, facial recognition. For example, an image may be analyzed to determine an individual's height, weight, gender, age, hair color, eye color, facial template, facial size, articles of clothing worn by the individual (including any colors or logos associated therewith), other visually perceptible distinguishing characteristics of the individual, including a bib number, a jersey number, bar code, QR code, or similar pattern that might be detectable in an image of an individual, or combinations thereof.

Although the machine learning, facial recognition, and/or other image recognition algorithms may vary in their specific approaches, generally, the machine learning software component attempts to associate one or more features in an image with the subject identifier provided in the training data set. Additional inputs can be supplied to the machine learning software component. For example, in addition to the images and subject identifiers, the machine learning component can be supplied with additional visual elements to help identify a subject in an image, or other parameters that may be used to distinguish between individuals. For example, additional visual elements can include the individual's height, weight, age, gender, hair color, eye color, facial template, facial size, colors or logos associated with articles of clothing worn by the individual, other identifying information, such as a bib number, a jersey number, a barcode, a QR code, or similar pattern that might be detectable in an image of a subject, or combinations thereof. Other distinguishing parameters can include past or anticipated performance data for the individual, such as an average pace over one or more prior events, a start time, a projected finish time, or a projected pace.

Images from other sources may also be used as supplemental or additional input for the machine learning software component. For instance, one or more images from one or more additional cameras may be associated with a subject identifier in a training data set. The primary and one or more supplemental images, in some cases, can be correlated by time. The one or more supplemental images may, for example, provide views of an individual from one or more additional perspectives, such as images of the subject taken from in front of the individual, behind the individual, above the individual, or from a side of the individual. In a particular example, a plurality of the images associated with a subject identifier in a training data set are obtained using a plurality of networked cameras.

Figure 2:
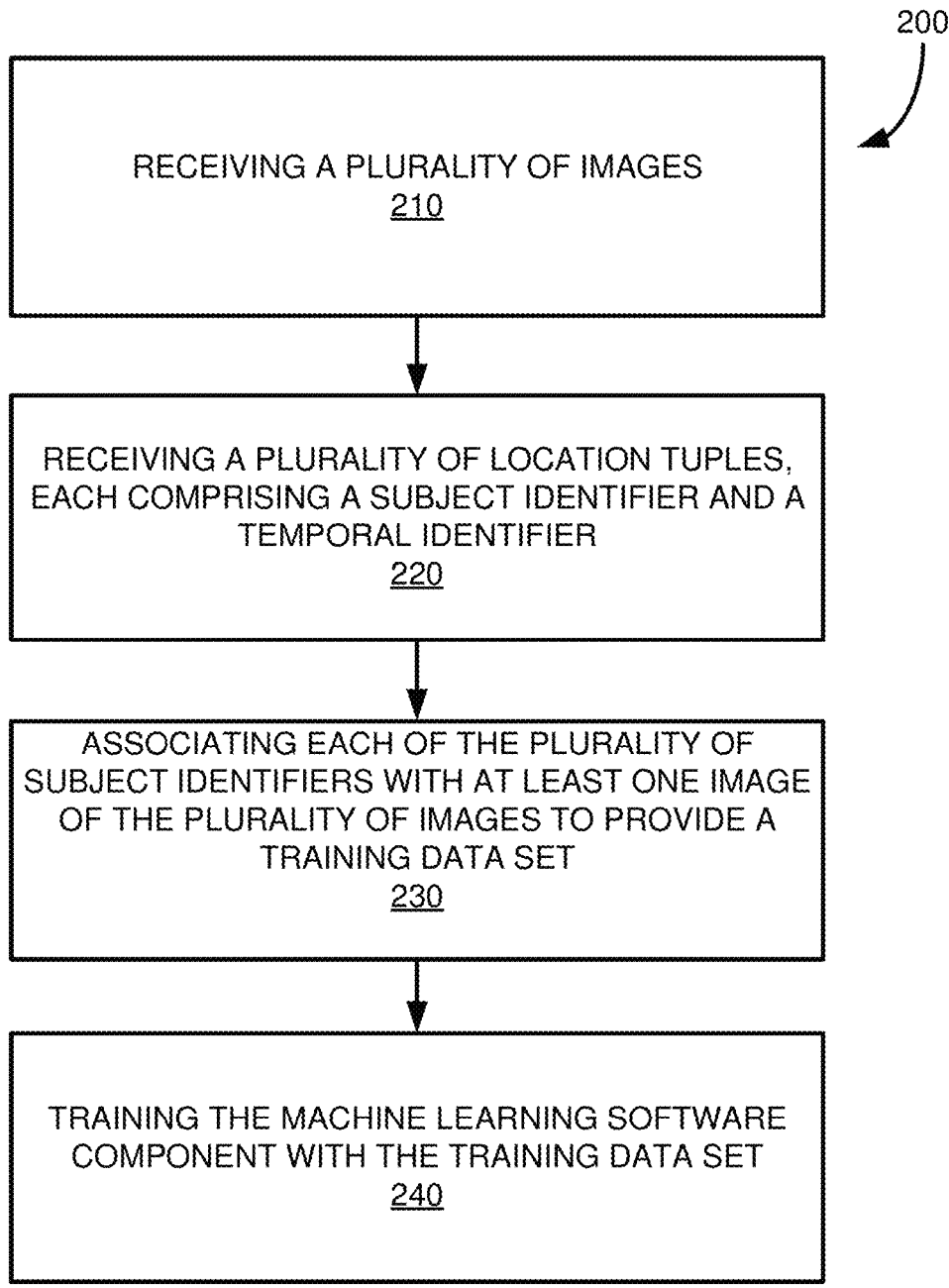
FIG. 2 is a flowchart of a method according to an embodiment of the present disclosure for training a machine learning software component.

FIG. 2 presents a flowchart of a method 200 providing further details regarding a particular implementation of steps 110 and 120 of the method 100 of FIG. 1. In step 210, a plurality of images are received. In step 220, a plurality of location tuples are received. Each of the plurality of location tuples includes a subject identifier and a temporal identifier. Each of the plurality of subject identifiers is associated with at least one image of the plurality of images, such as using the temporal identifiers, to provide a training data set in step 230. In step 240, the machine learning software component is trained using the training data set.

Returning to FIG. 1, in step 130, a classification image set is obtained. The classification image set is one or more images to be analyzed for the presence of one or more individuals. The classification image set, in at least some implementations, is obtained proximate an at least substantially fixed, particular location. For example, the classification image set may include one or more images taken at a particular location on a race course, including a start line or a finish line.

In particular implementations, multiple images taken at approximately the same time proximate the particular location can be obtained and analyzed. The use of multiple images may improve classification accuracy. In some cases, images may be obtained from multiple sources. For example, in addition to an official camera located proximate the particular location, images may be obtained from spectators or other individuals proximate the particular location, such as using mobile computing devices (for example, a smartphone or a tablet computing device).

In addition to the image contents, information associated with the image may be used to help classify the image. For example, the image may be associated with GPS data indicating a location from which the image was captured, which can then be related to the particular location. Similarly, a Bluetooth low energy (BLE) beacon (or similar device) can be placed proximate the particular location, and the camera may determine its distance from the BLE beacon and include this data along with the image to be classified.

In step 140, the classification image set is analyzed with the trained machine learning software component. The machine learning software component may provide various output. In one implementation, the machine learning software component outputs one or more images that are, or may be, associated with a particular individual. For example, the classification image set may include multiple images of the individual proximate the particular location. In other cases, the one or more images may represent candidate images that may be associated with a particular individual, but which are not necessarily definitively associated with the individual.

In another implementation, the machine learning software component outputs one or more subject identifiers indicating one or more individuals that are, or may be, present in the classification image set, or one or more specific images of the classification image set. In particular examples, in addition to providing a putative identification of one or more individuals who may be present in the classification image set or image(s) thereof, the output of the machine learning software component may include a confidence value indicating the likelihood the subject identifier is associated with the classification dataset or image(s) thereof.

In some aspects of the present disclosure, the machine learning software component only outputs data that meets or exceeds a confidence threshold, such as a determined or predetermined confidence threshold. In particular examples, the confidence threshold may be determined by a user. For example, a user may wish to view, or further analyze, such as in optional step 150, a larger number of results, even if some of the results ultimately are determined not to be appropriately associated with the putative subject identifier (i.e., some of the initial results are later determined to be false positives). In other cases, such as if the machine learning software component is typically accurate in associating subject identifiers with images in the classification image set, a user may set a higher confidence threshold.

In other aspects, the machine learning software component can output data in a different manner. In one implementation, the machine learning software component outputs all of the results that are identified as potentially being associated with a particular subject identifier. In another implementation, a number, such as a determined or predetermined number, of results may be returned by the machine learning software component. For example, a user may request that the top result be returned, or the top 5 results be returned.

The results may be further analyzed in optional step 150. For example, a user may manually review the results, such as to confirm that a subject identifier is properly associated with an image. In other implementations, the results may be analyzed using another software component. For example, the software component may employ another machine learning or image recognition (including facial recognition) algorithm, or a combination thereof. In another example, the results are analyzed by software applying another technique, such as the scoring technique described in Example 2.

The images and data of the results may be used for a variety of purposes. For instance, images taken during a sporting event, such as a race, may be made available to users or generally available to other interested parties. In other implementations, the images are used to generate temporal information. For example, if the images in the classification set are associated with a temporal sequence, the result set may also be ordered in a temporal sequence. The temporal sequence may be used to determine an order in which individuals passed proximate a particular location, such as a finish line of a race course. The result set may thus be used to determine an order in which participants completed an event.

As another example, the images (including their associated data, including metadata) may be analyzed to determine a time associated with the image, such as the time the image was acquired, which can then be correlated to when the individual was located proximate the particular location where the image was acquired. The times so acquired can be used for various purposes, such as to determine when an individual crossed a finish line, or other point along a race course.

In particular implementations, the time associated with an image is provided by metadata associated with the image. For example, the image may be associated with exchangeable image file format (Exif) data, which typically includes the time at which an image was acquired. For video images, in some cases, individual frames of the video may include a timestamp indicating when the frame was acquired. In other cases, the video may include a timestamp indicating the time at which recording was initiated for a particular video segment (that includes one or more frames). In such cases, one way to determine the time associated with a particular image/frame of the video recording is to multiply the frame number of the image by the video capture rate (such as 24 frames per second) and add the resulting value to the time the recording was initiated. In other examples, the time data may be associated with the image in another manner.

Figure 3:
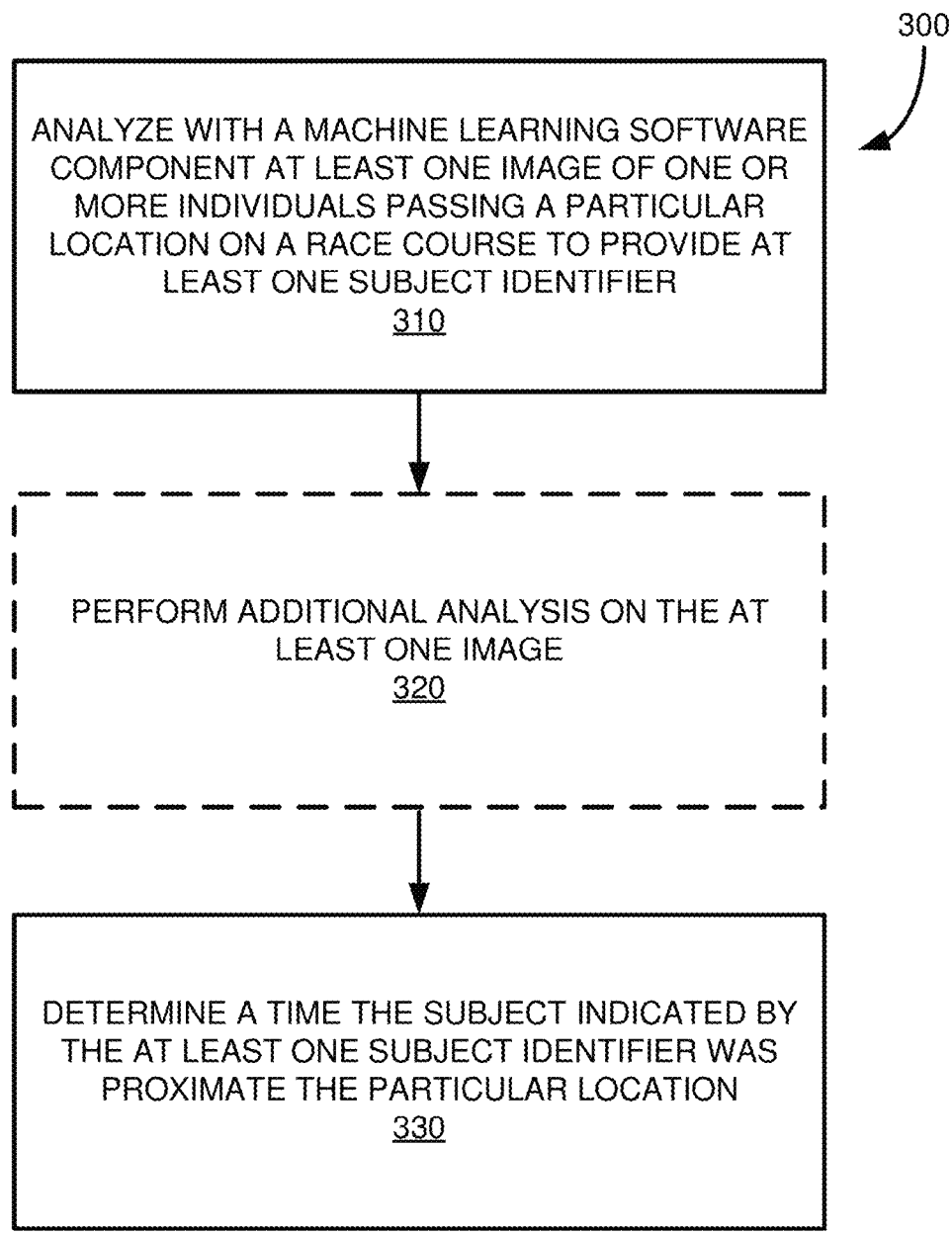
FIG. 3 is a flowchart of a method according to an embodiment of the present disclosure for identifying an individual in an image using a trained machine learning software component and determining a time the individual was proximate a particular location.

FIG. 3 presents a flowchart of a method 300 providing further detail regarding a particular implementation of steps 130-150 of the method 100 of FIG. 1. In step 310, at least one image of one or more individuals passing a particular location, such as a particular location on a race course, is analyzed with a machine learning software component to provide at least one subject identifier. Additional analysis, such as manual or automated analysis, may be performed on the at least one image in optional step 320. In step 330, the time the subject indicated by the at least one subject identifier passed the particular location is determined.

Figure 4:
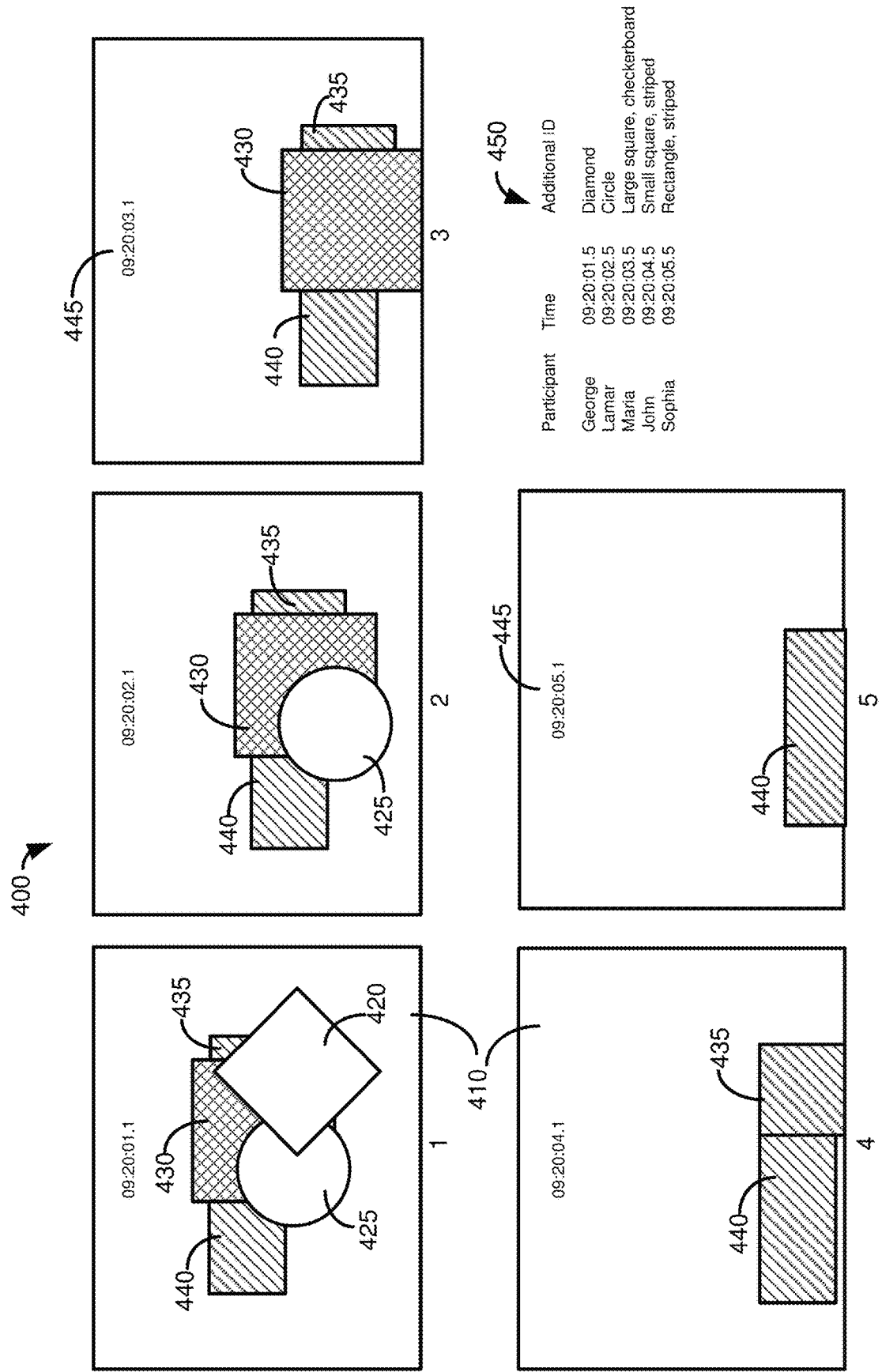
FIG. 4 is a diagram illustrating how temporal identifiers can be used to associate subject identifiers with images for use in training a machine learning software component.

FIG. 4 presents a schematic diagram illustrating how an embodiment of a method according to this Example 1 may be applied to a series of images 400. Each image 410 of the series of images 400 includes at least one element associated with an individual. For simplicity of representation, the individuals are shown as simple geometric shapes, some of which include a fill pattern. Each of the elements is associated with a subject identifier, such as a name. As an example, diamond shape 420 may be associated with an individual named "George," circle shape 425 may be associated with an individual named "Lamar," square shape 430 with the checkerboard pattern may be associated with "Maria," the smaller square shape 435 with the striped fill pattern may be associated with "John," and the rectangular shape 440 with the striped fill pattern may be associated with "Sophia."

The images 410 are shown in a temporal order, with sequential numbers 1-5 indicating the temporal order, such as an order in which the images were acquired. Each image 410 also include a time 445 indicating when the image was acquired (such as obtained from Exif data or other data or metadata associated with the image 410).

The image series 400 represents, in a particular example, the order in which the individuals 420, 425, 430, 435, 440 crossed the finish line of a race. Table 450 lists times at which the individuals 420, 425, 430, 435, 440 crossed the finish line, as determined by another method (such as manual timing, RFID tracking, or manual or otherwise independent review of the images 410).

The method 200 of FIG. 2 is carried out using the images 410 and the data in table 450. The images 410 are the images received in step 210. The data in the table 450 provides the subject identifiers (participant names) and temporal identifiers (finish times) used as the plurality of location tuples.

From FIG. 4, it can be seen that the times listed in table 450 are offset from the times 445 of the images 410 by four tenths of a second. This may be for a variety of reasons. As an example, a clock used to produce the times 445 may be temporally offset relative to a device used to produce the times listed in the table 450 (such as a clock associated with a RFID system used at the same time the images 410 of the individuals were obtained). As another example, the locations at which the times 445 and the times in the table 450 were acquired may be physically offset. For example, the camera used to acquire the images 410 may have been located slightly ahead of equipment used to record RFID times, such that, on average, it took another 0.4 seconds for an individual to travel from the location where the images were captured to the location where the RFID signal was recorded.

In some cases, when times are offset, the offset can be consistent (or treated as consistent) between individuals. In other cases, the offset can vary between individuals, and be compensated for on an individual basis. For instance, in the example provided above where a camera and RFID sensor are physically offset, it may be desirable to determine an offset for an individual (or subgroups of individuals, such as subgroups defined by pace ranges), rather than using a single value for the offset (such as an average value). Particularly if the camera used to acquire the images has a large field of view, or is located at further differences from the other timing device (such as a RFID sensor) pace differences between individuals may result in insufficiently accurate correlation of times.

In one aspect, the individual's pace, such as their pace proximate a location whether an image was acquired or time determined, can be used to determine an offset value. The pace of an individual can be determined, in particular examples, from the times the individual was first and last detected by an RFID sensor (including information regarding the individual's proximity to the sensor, or the effective range of the RFID sensor), from GPS data associated with the individual, or using a BLE beacon. Thus, an individual whose RFID tag was sensed for 10 seconds may have a different pace than an individual whose RFID tag was sensed for 4 seconds, and the offset values used for the individuals may be correspondingly different.

In the case of FIG. 4, step 230 of FIG. 2 is carried out by associating the times and subject identifiers of FIG. 4 with the appropriate image 410, which is accomplished by subtracting 0.4 seconds from the times in table 450. As discussed above, in some cases, the temporal identifiers are not offset with respect to the images, in which case the images and subject identifiers can be directly associated using the temporal identifier.

The images 410 with the subject identifiers form a training data set that is used to train a machine learning software component, such as an artificial neural network. As shown, each image 410 is associated with a single individual. However, in another embodiment, a given image 410 may associated with more than one individual, provided a suitable training data set is available. For example, the machine learning software component may learn to recognize George 420 because George was identified as being in image 1. In some cases, the learning may be facilitated if the individual to be learned is the most prominently featured individual in the image. However, learning may be facilitated (which can provide increased accuracy when the machine learning software component is later used to classify images) by identifying multiple individuals in an image. For example, Maria 430 is visible in images 1, 2, and 3. While Maria is most visible in image 3, supplying the additional images of Maria in images 1 and 2 to the machine learning software component can help it become more accurate at identifying Maria in other images. As described above, one or more supplemental images (such as from cameras providing additional views, including from one or more different perspectives, of an individual at a common time or location), can be supplied as training data to the machine learning software component. In some cases, supplemental images can be correlated by time to a primary image and used, by the machine learning software component or during post-processing, to help classify an image, such as an image to be classified that originally was not classified with a desired level of confidence.

Similarly, at least certain machine learning software components may be able to use the known absence of Maria to better identify Maria in future images, or to distinguish between other individuals. For example, if it is known that Maria 430 is present in image 3, but not present in images 4 and 5, the absence of Maria in images 4 and 5 can help the machine learning software component distinguish John 435 and Sophia 440 (who are present in images 3 and 4, and 3-5, respectively).

Table 450 provides additional data that may be used to train the machine learning software component, and/or further analyze the results of using the trained machine learning software component to classify one or more images. For example, table 450 lists the shapes associated with each of the individuals 420, 425, 430, 435, 440. In real world uses, the shape descriptions may be analogous to features such as an individual's height, weight, gender, or age, or other particular physical characteristics of the individual (such as body or face type, or eye or hair color). For the individuals 430, 435, 440 (Maria, John, and Sophia), table 450 lists information about a visual pattern possessed by the individual. In real world scenarios, the pattern information may be analogous to items of clothing worn by the individual, logos associated therewith, or other visually perceptible identifying information, such as a bib number, a jersey number, bar code, QR code, or similar identifier.

Figure 5:
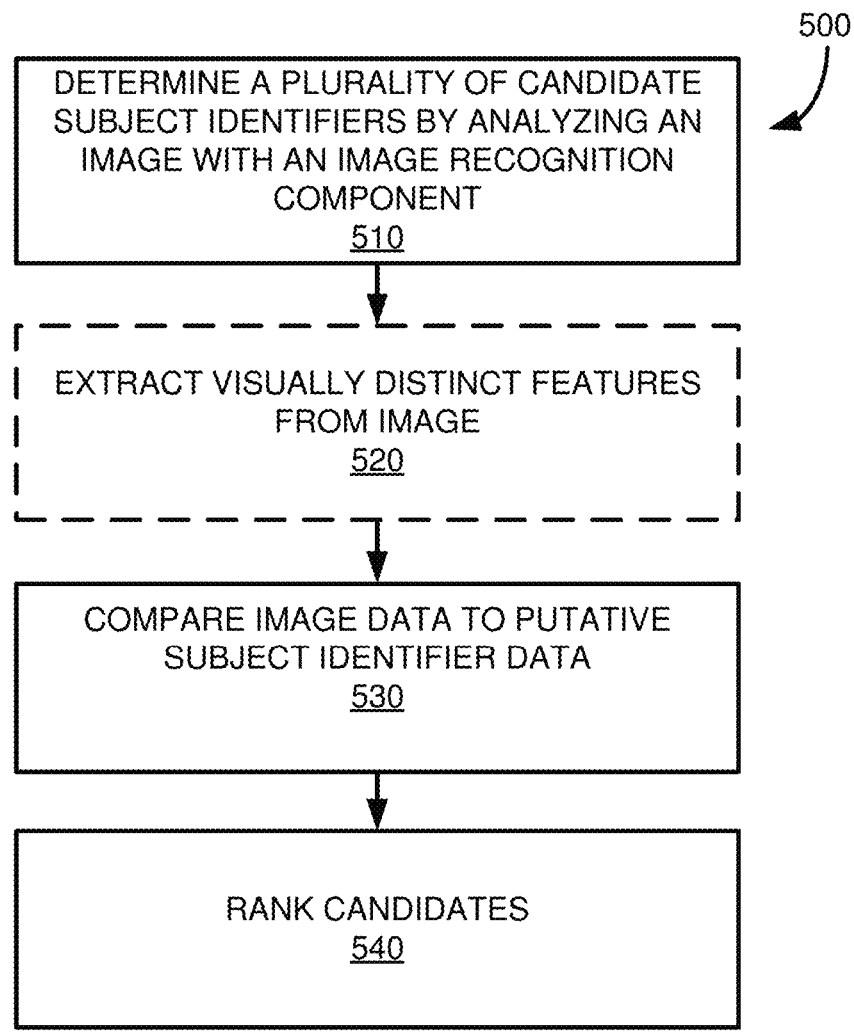
FIG. 5 is a flowchart of a method according to an embodiment of the present disclosure for identifying an individual depicted in an image using supplemental scoring parameters.

Example 2—Determination of Subject Identifiers Using Supplemental Scoring Parameters As illustrated in FIG. 5, this Example 2 provides a method 500 for associating a subject identifier (which identifies an individual) with one or more images. In step 510, a plurality of candidate subject identifiers potentially representing an individual depicted in an image are determined using an image recognition or analysis component. For example, an image analysis process, such as the process described in Example 1, can provide a result set that includes more than one candidate image that may be associated with a subject identifier and/or an image that is associated with more than one candidate subject identifier. For example, a result set may include several images, including some that include subject $S_1$, some that include subject $S_2$, and some that include both subjects $S_1$ and $S_2$. If subjects $S_1$ and $S_2$ have similar characteristics when analyzed by the image analysis process, the image analysis process may not be able to suitably distinguish between $S_1$ and $S_2$. The image or images in the result set can be analyzed using one or more supplemental scoring parameters to try and further distinguish between $S_1$ and $S_2$.

Visually distinct features may be used as supplemental scoring parameters. For example, the image analysis process may initially produce a result set by using a facial recognition algorithm. The results of that image analysis process may, in optional step 520, then be further analyzed by another image analysis process, such as by analyzing the images with a feature extraction component and then using a subject identifier component to apply one or more supplemental scoring parameters. Supplemental scoring parameters can include features such as an individual's age, height, eye color, hair color, weight, skin tone, gender, and articles of clothing worn by the individual, including their color and any logos (such as brand logos or team logos) associated therewith. Supplemental scoring parameters can also include identifying information, such as a bib number, a jersey number, a barcode, a QR code, or similar pattern that might be visible in an image of an individual. For example, an optical character recognition (OCR) algorithm may be applied to images in the result set to try to identify numbers present on an individual depicted in the image, which numbers can then be cross referenced against numbers associated with potential subject identifiers.

In step 530, image data, including features extracted from the image or other information associated with the image, is compared with putative subject identifier data, such as using a subject identifier software component. Data associated with the image can include temporal information, such as a time the image was acquired, or location information, such as how far the location where the image was acquired is located from another point (such as the start line of a race).

Past, current, or anticipated performance information can be used to distinguish between potential subject identifiers that may be associated with an image. Prior performance data, such as finish times at prior, similar, events, or average pace information, may be used. Take, for example, an image associated with a finish time of four hours and five minutes. The image analysis process indicates that either $S_1$ or $S_2$ are present in the image, such as being likely to be present in the image within a given confidence level. If subject $S_1$ has prior finish times, average pace times, or other information that would provide a projected finish time of two hours and thirty minutes, and subject $S_2$ has prior finish times, average pace times, or other information that would provide a projected finish time of four hours and twenty minutes, it is more likely that the image depicts $S_2$ than $S_1$, and so the image may be associated with $S_2$ by the subject identifier software component.

In some implementations, strengthening or weakening confidence in a connection between a subject identifier and an image in step 530 can be used in evaluating putative associations between other images and subject identifiers. For example, if an image is identified as potentially associated with subjects $S_1$, $S_2$, and $S_3$, and $S_2$ has already been associated with another image, it may be possible to narrow the individuals potentially associated with the image to $S_1$ and $S_3$. If desired, analyzed images may be used to update the image analysis process, such as a machine learning software component. That is, images identified as depicting an individual, or not depicting an individual, can be used as additional training data or as corrective feedback.

Another supplemental scoring parameter that may be used to help associate images with a subject is the subject's start time. For example, if an image was acquired at 9:30 am, but an individual $S_1$ did not start the relevant event until 9:45 am, $S_1$ can be eliminated as a candidate for the 9:30 am image. The start time may be combined with other supplemental scoring parameters. For example, the start time plus prior or anticipated performance data can be used to eliminate an individual as a potential candidate that might be associated with an image. For example, if an image was acquired at 10:30 am, an individual $S_1$ started the event at 9:30 am, and $S_1$'s anticipated finish time was two hours, $S_1$ can reasonably be eliminated as a candidate that might be present in the 10:30 am image.

In particular examples, multiple supplemental scoring parameters are used to help associate the correct subject identifier with an image. For example, values provided by analyzing multiple supplemental scoring parameters may be averaged or otherwise combined to produce an overall ranking or score that indicates the likelihood of an image depicting a particular individual.

In some cases, the supplemental scoring parameters may be weighted equally. In other cases, the supplemental scoring parameters may be given different weights. The weighting scheme used (including instances where multiple or all supplemental scoring parameters are equally weighted) may, in some aspects of the present disclosure, vary, such as based on automatic criteria or according to user input. For example, if images were obtained on a cloudy day, eye color might be weighted more heavily than on a sunny day where individuals are more likely to be wearing sunglasses. This change in weighting might occur because a user manually altered the weighting because the conditions were known to be cloudy, an image analysis process recognized that the images were cloudy and applied a rule that changed the weighting to account for cloudy conditions, or a machine learning software component may incorporate the weighting as part of its training or during classification (such as in an error correction/reduction process).

In step 540, the candidate subject identifiers for an image are ranked (or otherwise selected) according to their probability of being associated with the image.

Figure 6:
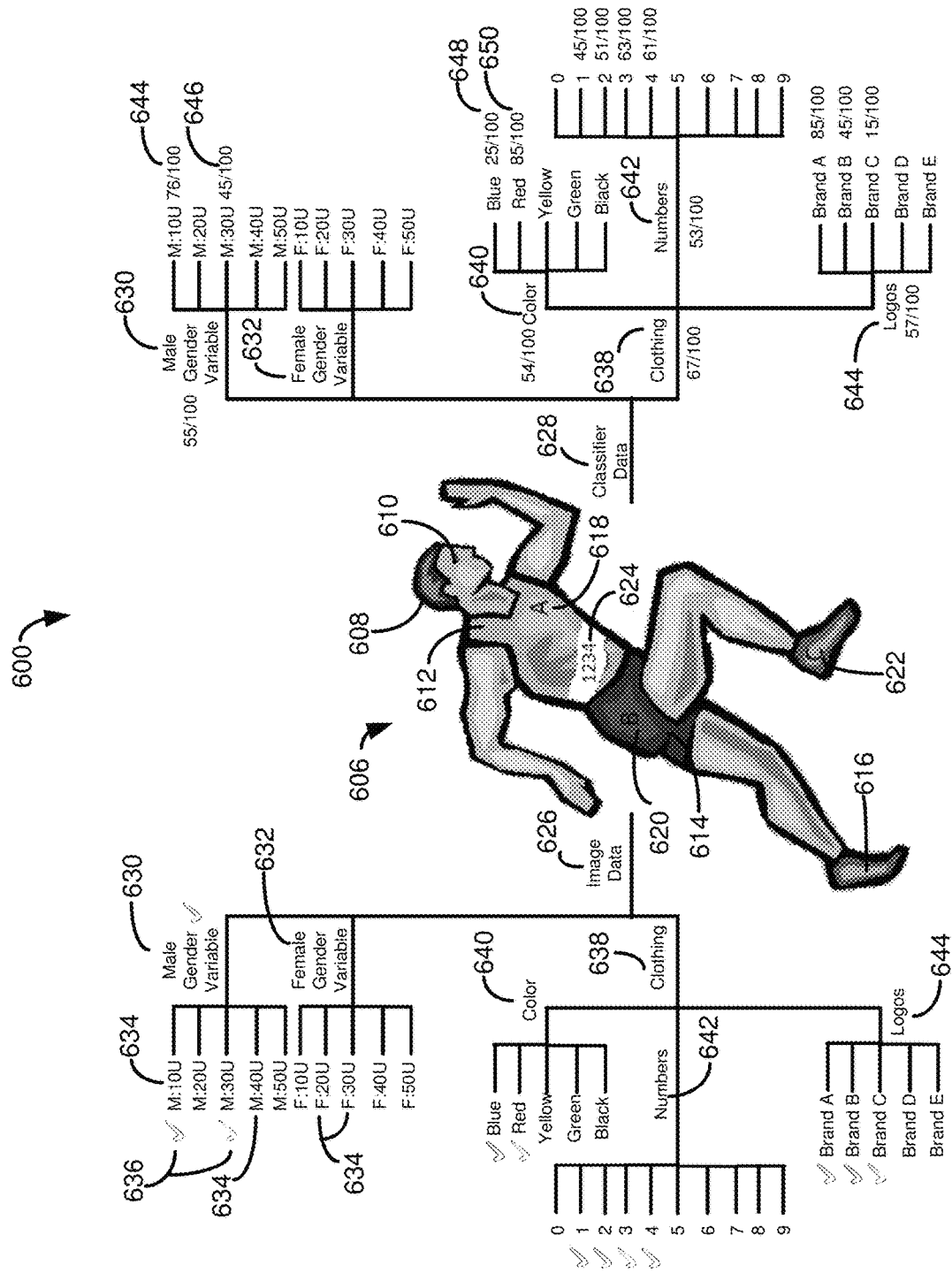
FIG. 6 is a diagram illustrating how supplemental scoring parameters extracted from an image may be associated with putative subject identifiers.

FIG. 6 illustrates a schema 600 for analyzing multiple supplemental scoring parameters in an image. The schema 600 is associated with an image 606 of an individual. The image 606 includes multiple visually perceptible features, including hair color 608, eye color 610, a shirt color 612 (such as an orange shirt), a shorts color 614 (such as red shorts), and a shoe color 616 (such as blue shoes). The articles of clothing may also bear identifying information, such as logos. For example, the shirt has a logo 618 associated with brand A, the shorts have a logo 620 associated with brand B, and the shoes have a logo 622 associated with brand C. The individual is also wearing a bib 624, which bears a plurality of numbers.

The schema 600 illustrates a plurality of features that may be identified as photo data 626 associated with the image 606 to be classified. The features may then be compared with classifier data 628 for one or more potential subject identifiers.

The features include male 630 and female 632 variables, indicating whether the image is likely to depict a male or female individual. The male 630 and female 632 variables may include a number of subfeatures 634. The subfeatures 634 may represent, for example, particular image components that are evaluated and associated with having a given gender. The image components may include features such as face shape, arrangement and size of facial features, body shape, and relative sizes and shapes of individual body subfeatures (such as relative lengths and diameters of arms and legs). As shown in FIG. 6, the image 606 has been determined to be of a male, based at least in part on the identification of subfeatures 636.

The features of the schema 600 may also include clothing subfeatures 638 associated with clothing worn by the individual. Clothing subfeatures 638 include colors 640 associated with the image 606, such as colors associated with articles of clothing worn by the individual. In the example schema 600 shown, the presence of a color on the individual is determined, but the color is not associated with a specific article of clothing on the individual, or a particular region of the individual (feet, waist, chest, etc.). However, if desired, color information could be determined at a more granular level. As shown in FIG. 6, the image 606 has been determined to include that blue and red articles of clothing are present in the image 606.

Another feature of the schema 600 is numbers 642 associated with the image 606. The numbers may be, for example, associated with the bib 624. As shown, the numbers 1, 2, 3, and 4 have been identified in the image 606. In particular examples, the numbers are recognized in the image 606 using an optical character recognition technique.

The schema 600 also includes features associated with logos 644 detected on the image 606. As shown, logos associated with brands A, B, and C were detected on the image 606.

The features in the photo data 626 identified in the image 606 are compared with corresponding features in classifier data 628 (such as data associated with potential subject identifiers) to try to associate the image 606 with a subject identifier, such as within a given confidence level. As shown, for the male variable 630, subfeature 644 is associated with a particular subject identifier with a confidence of 76/100, while subfeature 646 is associated with the subject identifier with a confidence of 45/100. The male variable 630 has an overall confidence of 55/100 for the candidate subject identifier. As described above, in some cases, supplemental scoring parameters may be averaged, while in other cases they may be combined in a weighted manner.

Similarly, the color feature 640 has an overall confidence of 54/100, with the blue subfeature 648 having a confidence of 25/100 and the red subfeature 650 having a confidence of 85/100. The confidence values for numbers 642 and logos 644 identified on the image 606, and their respective subfeatures, may be calculated in an analogous manner.

Example 3—Image Selection from Multiple Images

In some cases, such as when carrying out the methods of Example 1 or Example 2, multiple images may be obtained of an individual located proximate a particular location. For example, as series of photographs or video frames may show an individual approaching the particular location and then moving away from the particular location. In some aspects of the present disclosure, it can be desirable to identify an image that is most accurately associated with when the individual was proximate the particular location. For instance, if images are used to determine a time a user crossed a finish line (such as described in Examples 1 or 2), it may be desirable to determine the time based on the image that most closely matches the user crossing the finish line, rather than an image that shows the individual in front of or in back of the finish line.

According to this Example 3, the most appropriate image can be selected by measuring the size of an image feature in an image, such as the size of a body element of an individual. For example, it may be determined that, based on the relative locations of a camera and the particular location, that an individual's body element, such as their head, should be a certain size when they are proximate the particular location. The size can be measured in various units, including typical units of length, such as inches and millimeters, or in units such as pixels.

In particular examples, the image selected can be the first image where the body element meets or exceeds a certain threshold size. In another example, the size of the body element can be measured over a series of images. For example, the size of the body element may increase as the individual approaches the camera and then decrease as the individual moves away from the camera. The image may be selected based on this variation, such as selecting the image with a maximum body element size, or at some other desired point in the series of images.

Figure 7:
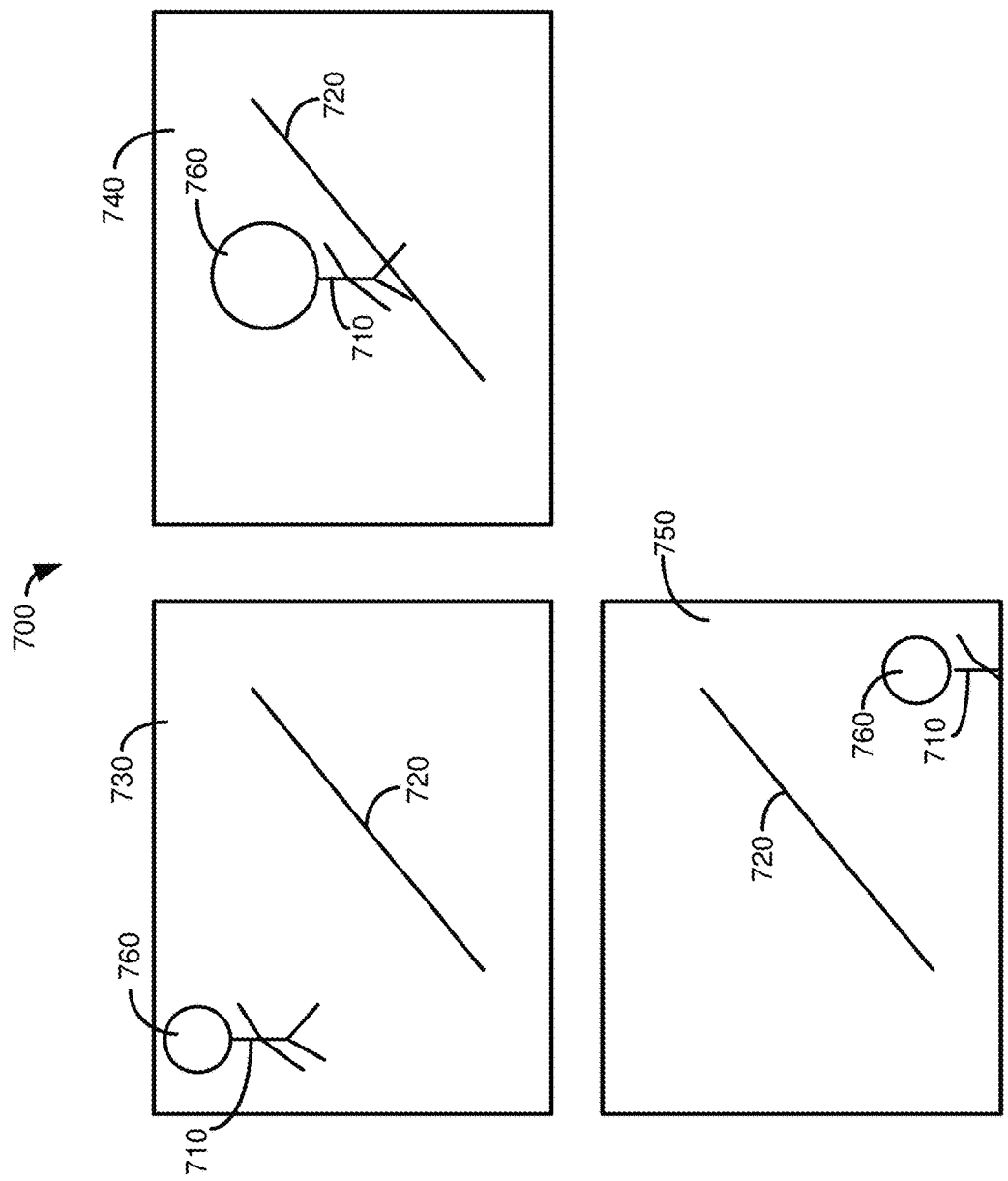
FIG. 7 is a diagram illustrating how an image representing an individual proximate a particular location can be determined by analyzing an image element over a series of images.

FIG. 7 provides a schematic diagram of a series of images 700 representing how the size of an image feature can be used to select an image from multiple images. FIG. 7 depicts an individual 710 and a race finish line 720 in three separate, chronologically ordered images 730, 740, 750. In image 730, the individual 710 is approaching the finish line 720. The individual's head 760 is a first size. In image 740, the individual 710 is crossing the finish line 720, and the individual's head 760 is a second size that is larger than the first size. In the image 750, the individual 710 has crossed the finish line 720 and is moving away from it. The individual's head 760 is a third size, which is less than the second size.

As shown in FIG. 7, even without determining the location of the individual 710 relative to the finish line 720, image 740 can be selected as best representing the point at which the individual 710 crossed the finish line 720 by noting that the head element 760 is largest in image 740.

Figure 8:
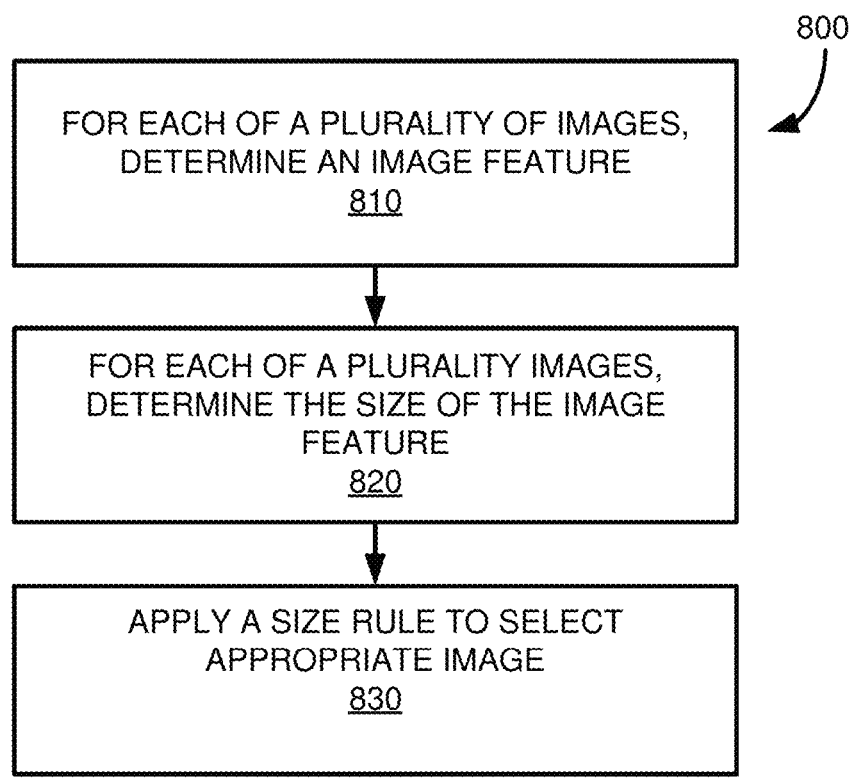
FIG. 8 is a flowchart of a method according to an embodiment of the present disclosure for selecting an image of an individual passing a particular location from a series of images by applying a size rule to an image element of the plurality of images.

FIG. 8 provides a flowchart of a method 800 according to this Example 3 for selecting an image representing when an individual passed proximate a location based on a series of images of the individual proximate the location. In step 810, an image feature is identified in each of the images of the individual proximate the location. The size of the image feature in each of the images is determined in step 820. In step 830, one or more size rules are applied to select the appropriate image based on the sizes of the image feature determined in step 820.

Example 4—Retrieval and Display of Information Associated with an Identified Individual In another aspect, the present disclosure provides a method for retrieving and displaying information associated with an individual identified in an image. For example, images of individuals whose information might be of interest to a user can be included in a training data set for a machine learning software component, including as described above in Example 1, or visual or other identifying features can be provided for such individuals, such as for use in the embodiment of Example 2. However, in other implementations, an individual in an image can be identified using any suitable method.

One or more subject identifiers associated with the individual (such as a name or an identification number) are linked to information associated with the individual. The information can include biographic information associated with the individual, including performance information.

In a particular implementation, a user observing a sporting event may wish to obtain information associated with a participant. In one illustrative example, the participant may be, for example, a friend or relative of the user who is running a race and about whom the user desires to obtain information (such as pace data over the race course, or a projected finish time). In another example, the participant may be a favorite athlete of a user about whom the user would like to view performance data (such as points scored by the athlete in a current sporting event). The user may obtain an image of the participant, such as using a tablet, smartphone, or other mobile computing device. An application running on the mobile computing device may send the image to a remote computing system where it is analyzed to determine a subject identifier associated with the individual. If the remote computing system identifies the individual, it can retrieve information regarding the individual, such as from a database, and send the information to the mobile computing device where it can be displayed to the user.

Figure 9:
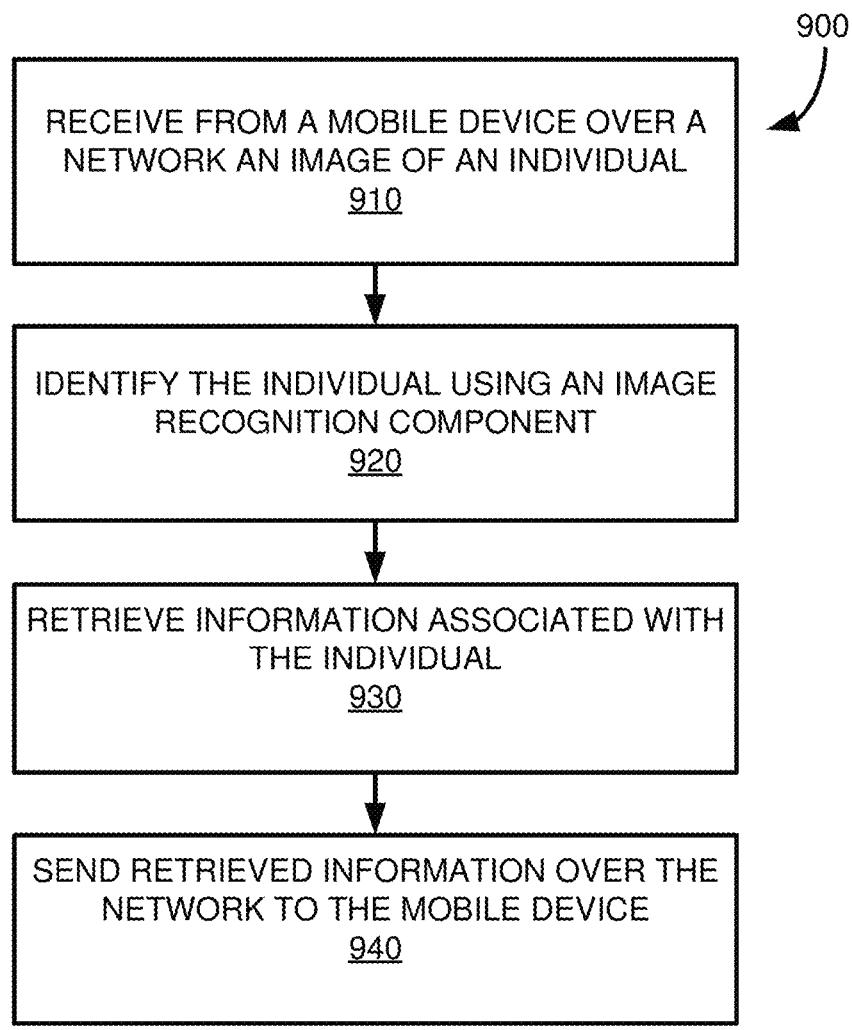
FIG. 9 is a flowchart of actions occurring at a remote computing system during identification of an individual depicted in an image and retrieval of information associated with the individual.

FIG. 9 presents a flowchart of a method 900 representing actions occurring at a remote computing system according to an implementation of this Example 4. In step 910, the remote computing system receives an image of an individual over a network from a mobile computing device. In step 920, the remote computing system identifies the individual using an image recognition component which can, for example, use the methods of Examples 1 or 2. In step 930, the remote computing system retrieves information associated with the individual, such as from a database. The remote computing system sends the retrieved information over the network to the mobile device in step 940.

Figure 10:
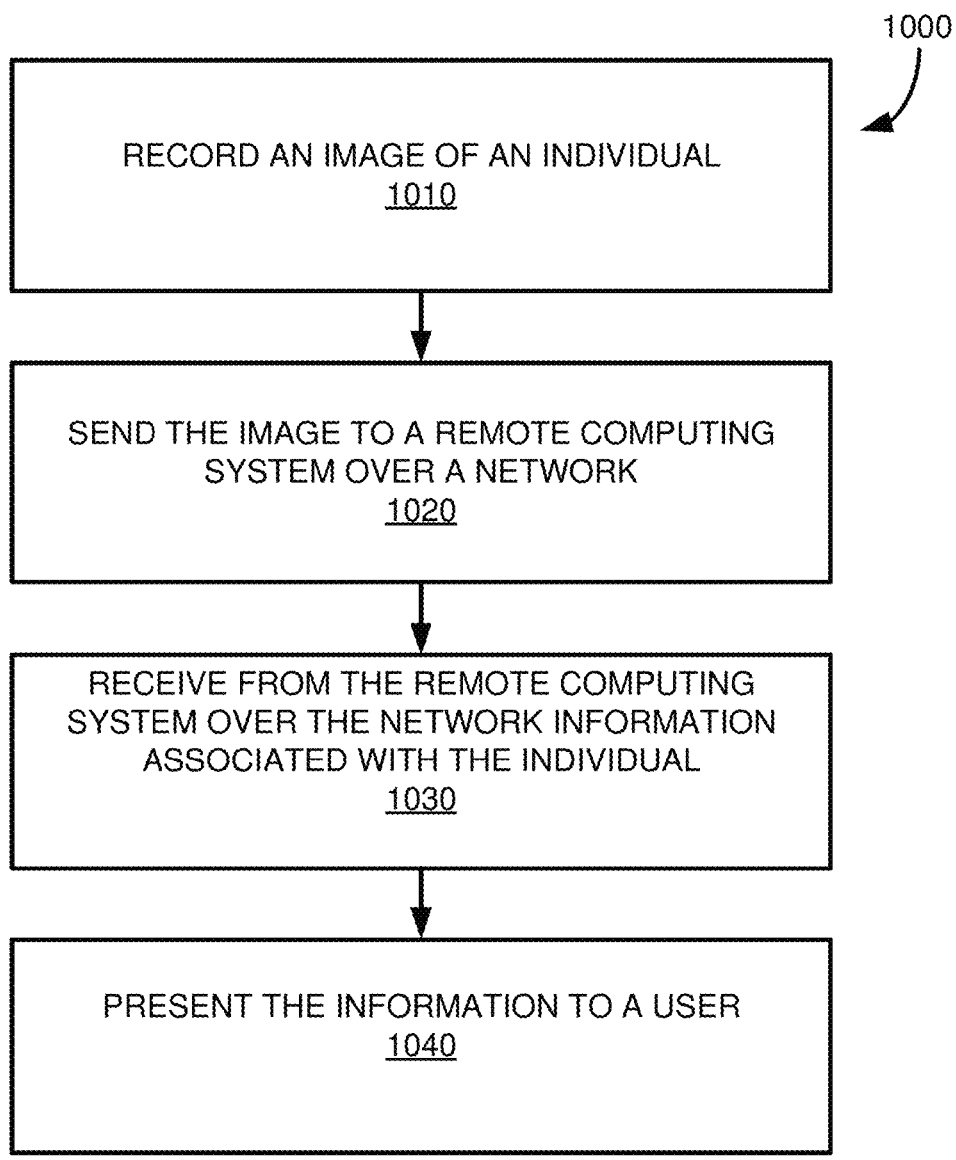
FIG. 10 is a flowchart of actions occurring at a mobile computing device during identification of an individual depicted in an image and display of information associated with the individual.

FIG. 10 presents a flowchart of a method 1000 representing actions occurring at a mobile computing device according to an implementation of this Example 4. In step 1010, the mobile computing device records an image of an individual, such as in response to user input. In addition to the image contents, information associated with the image may be obtained, sent to the remote computing system, and used to help classify the image. For example, the image may be associated with GPS data indicating a location from which the image was captured, which can then be related to the position of the individual in the image. Similarly, a Bluetooth low energy (BLE) beacon (or similar device) can be placed proximate a particular location, and the camera may determine its distance from the BLE beacon and include this data along with the image to be classified.

In step 1020, the mobile computing device transmits the image (and, optionally, data associated with the image) to a remote computing system over a network. The mobile computing device receives information about the individual from the remote computing system over the network in step 1030. In step 1040, the information is presented to a user. For example, the information may be displayed proximate the image on the mobile computing device.

Example 5—Representative Software Architecture

Figure 11:
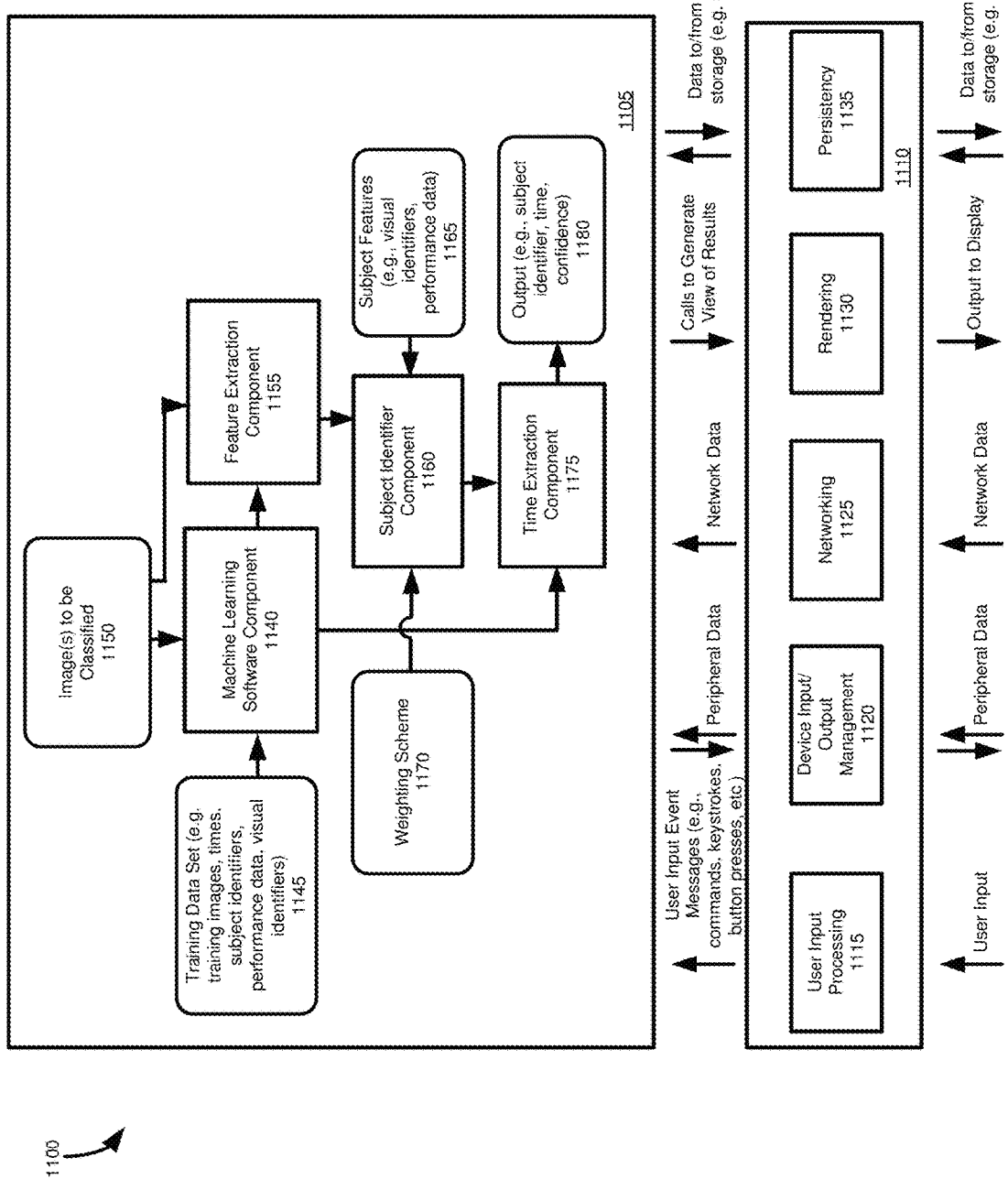
FIG. 11 is a block diagram illustrating an example software architecture in which an image analysis component may employ a machine learning software component and/or a subject identifier component to associate a subject identifier with an individual depicted in an image.

FIG. 11 illustrates an example software environment 1100 that can be used to implement an image analysis component 1105 that works with an operating system ("OS") 1110 to associate a subject identifier and, optionally, a time, with one or more images, such as using the methods of one or more of Examples 1-4. The software architecture 1100 can be implemented in any suitable computing device, such as a desktop computer, laptop computer, netbook, workstation, tablet computing device, or smartphone (or similar mobile computing device).

The image analysis component 1105 uses the services of the operating system 1110. The operating system 1110 includes a user input component 1115 for receiving and managing user input. For example, the operating system 1110 can receive various types of user input, such as input through keys, buttons, pointer input (such as using a mouse, trackball, or track pad), or input through voice commands or through a touchscreen (such as taps or finger gestures). The user input component 1115 creates data that can be received and used by the image analysis component 1105. For example, the image analysis component 1105 may listen for user input data from the user interface component 1115 and take appropriate actions. For example, the user input can indicate that the image analysis component 1105 should load and analyze one or more images, adjust weighting parameters, etc.

Figure 12:
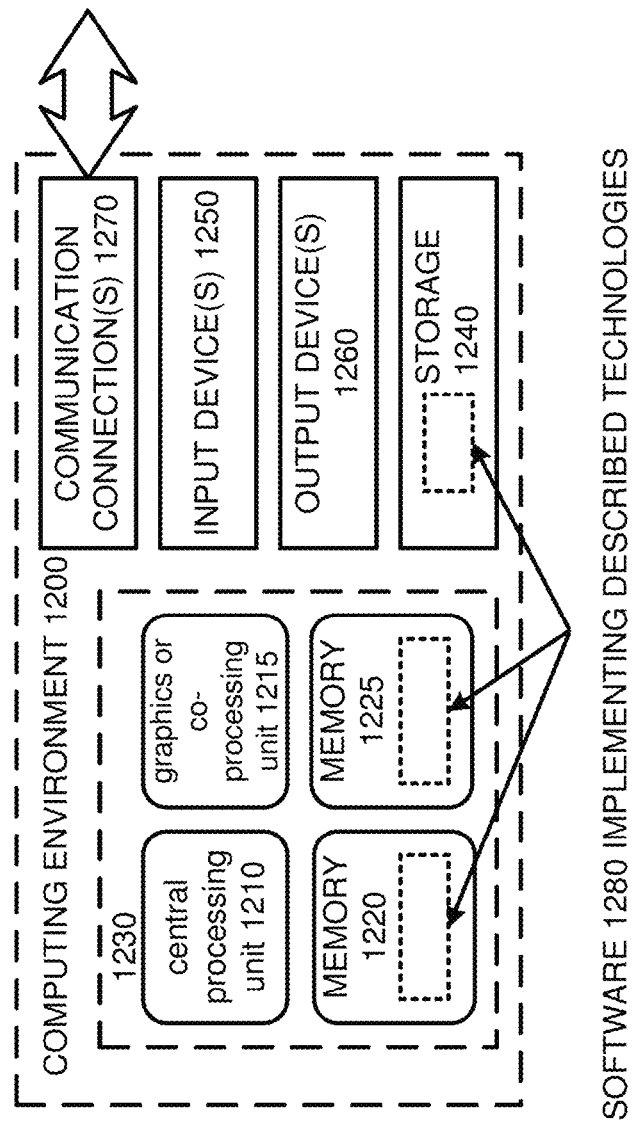
FIG. 12 is a diagram of an example computing system in which described embodiments can be implemented.

A device input/output management component 1120 of the operating system 1110 can manage the flow of information from devices in communication with the operating system 1110 (such as the input device(s) 1250 of FIG. 12). For example, the input/output management component 1120 can manage the flow of information from a camera or other image input device (such as a scanner) or information from timing devices, such as a RFID system.

A networking component 1125 of the operating system 1110 manages the flow of data over a network (not shown), including data sent from, and data sent to, the image analysis component 1105. In some cases, data is directly conveyed by the networking component 1125 to and from the image analysis component 1105. In other cases, the operating system 1110 can extract information from data it receives and provide the information to the network or the image analysis component 1105. In particular examples, the image analysis component 1105 and operating system 1110 are implemented in a computing system that interacts with a mobile computing device, such as a tablet or smartphone, a timing device, such as a RFID system, or a camera or other image input device (such as a scanner), over a network.

As used herein, the terms "send" to a destination entity refer to any way of transmitting or otherwise conveying data within a computer system or between two computer systems, whether the data is directly conveyed or conveyed through one or more intermediate entities. Similarly, the term "receive," such as to receive from a source entity, refers to the receipt of data within a computer system or between two computer systems, whether the data is received directly from the computer system of original transmission or received through one or more intermediate entities.

A rendering component 1130 of the operating system 1110 receives calls from the image analysis component 1105 to generate displays associated with the image analysis component 1105. For example, the image analysis component 1105, through the rendering component 1130, may cause a display to present a view of subject identifiers and their associated information, such as timing information (such as the time a subject indicated by the subject identifier passed proximate a particular location, such as a finish line of a race). The display may also include one or more analyzed images associated with the subject identifier. The display may be interactive, such that a user can select information to be viewed and cause the image analysis component 1105 to take various actions, such as through the user input component 1115 of the operating system 1110.

A persistency management component 1135 of the operating system 1110 can manage the flow of information to and from persistent storage, such as a hard drive or other types of non-transitory storage. For example, a user, through the user interface processing component 1115, may select to load images or other data to be analyzed using the image analysis component 1105 or to store results generated by the image analysis component 1105.

The image analysis component 1105 can include a machine learning software component 1140, such as in at least particular implementations of Examples 1 and 2. The machine learning component 1140 is optionally in communication with a training data set 1145, which can include, for example, training images, subject identifiers, and data to associate the training images with the subject identifiers (such as temporal identifiers). The machine learning software component 1140 may use the training data set 1145 to learn to recognize subjects in one or more images to be classified 1150. In other examples, the machine learning software component 1140 does not use a training data set, such as operating in an unsupervised manner.

The image analysis component 1105 may, optionally, include a feature extraction component 1155. The feature extraction component 1155 may be used to identify features in one or more images, such as the one or more images to be classified 1150, or from the results of the machine learning software component 1140 (which may provide, for example, a subset of the one or more images to be classified 1150, such as in a result set). The feature extraction component 1155 may, for example, be used to identify visually distinct features of an image, such as an individual's facial features, eye color, hair color, gender, clothing colors, logos associated with articles of clothing worn by a subject, visually perceptible indicators associated with a subject in the image (such as a bib number, a jersey number, bar code, or QR code), or combinations thereof.

When a feature extraction component 1155 is included, it is typically in communication with a subject identifier component 1160. In some implementations, the subject identifier component 1160 uses features extracted by the feature extraction component 1155 to try to identify one or more individuals in an image, such as using subject features 1165. For example, the subject identifier component 1160 may attempt to identify an individual in the image by matching features extracted from the image with visual features known to be associated with a particular individual (identified by a particular subject identifier). The subject identifier component 1160 can also attempt to identify an individual in an image using information other than visual features. For example, an image to be classified may be associated with other information, such as a time the image was acquired. Subject features 1165 can include information such as past or anticipated performance times that can be used by the subject identifier component 1160 to help identify an individual in an image.

The subject identifier component 1165, in some implementations, applies a weighting scheme 1170 to the subject features 1165 used to identify an image. In particular examples, the weighting scheme 1170 is dynamic, and may be altered, such as based on user input or by application of rules by the image analysis component 1105. For example, the weighting scheme 1170 may vary as the subject identifier component 1160 attempts to maximize a confidence value associated with the relationship between an image and a subject identifier.

The image analysis component 1105 optionally includes a time extraction component 1175. The time extraction component 1175 analyses one or more images provided by the machine learning software component 1140 or the subject identifier component 1160. For example, the time extraction component 1175 may extract a time from data or metadata associated with an image, such as Exif data. In other examples, the time extraction component 1175 may analyze one or more images to determine a time a subject crossed a particular location, such as described in Example 4. Analyzing the one or more images may also include analyzing data or metadata associates with the image(s), including Exif data.

The image analysis component 1105 generates output 1180, which may be displayed, for example, by making calls to the rendering component 1130 of the operating system 1110. The output 1180 typically includes an association of one or more subject identifiers with one or more images. The output 1180 can include additional information, such as a confidence value for a particular association between a subject identifier and an image, or a time, such as a time the individual indicated by the subject identifier was located proximate a particular location.

In some aspects, the image analysis component 1105 or operating system 1110 can include more or fewer components. In further aspects, the components of the image analysis component 1105 or operating system 1110 can be arranged differently. For example, components shown may be combined, separated into additional subcomponents, or implemented as part of another component.

Although FIG. 11 shows subcomponents of the image analysis component 1105 located in the same physical location as one another, and the operating system 1110, in other implementation one or more of the subcomponents can be located in a different physical location. For example, one or more (including all) of the subcomponents of the image analysis component 1105 can be located on a remote computing system, including a cloud-supported environment as described with reference to FIG. 13.

Example 6—Representative Computing Environment

FIG. 12 depicts a generalized example of a suitable computing environment (e.g., computing system) 1200 in which the described innovations may be implemented. The computing environment 1200 is not intended to suggest any limitation as to scope of use or functionality, as the innovations may be implemented in diverse general-purpose or special-purpose computing systems. For example, the computing environment 1200 can be any of a variety of computing devices (e.g., desktop computer, laptop computer, server computer(s), tablet computer, etc.).

With reference to FIG. 12, the computing environment 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing environment 1200. The storage 1240 stores instructions for the software 1280 implementing one or more innovations described herein.

The input device(s) 1250 may be a touch input device such as a keyboard, mouse, pen, or trackball, a voice input device, a scanning device (such as to provide scanned images for use in training a machine learning software component or images to be classified or otherwise analyzed, such as in an Example of the present disclosure), or another device that provides input to the computing environment 1200. The input device(s) 1250 can also include a camera, such as video or photographic camera that can be a standalone device or incorporated into another device (such as a camera in a laptop, tablet computing device, or smartphone). The camera can be used, for example, to provide images for use in training a machine learning software component or images to be classified or otherwise analyzed, such as in an Example of the present disclosure. RFID sensors can also be used as an input devices 1250, such as to provide the temporal identifier of a location tuple and/or a subject identifier of a location tuple.

The output device(s) 1260 may be a display, printer, speaker, CD-writer, or another device that provides output from the computing environment 1200.

The communication connection(s) 1270 enable communication over a communication medium to another computing entity, which may also be configured as described in this Example 6. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The communication connection(s) 1270 can be used to receive information for use in one or more of the Examples of the present disclosure. For example, the communication connection(s) 1270 can be used to send or receive images to be used in training a machine learning software component, images to be classified or otherwise analyzed, data related to such images (such as temporal data or performance information), or information related to location tuples.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Example 7—Cloud-Supported Environment

Figure 13:
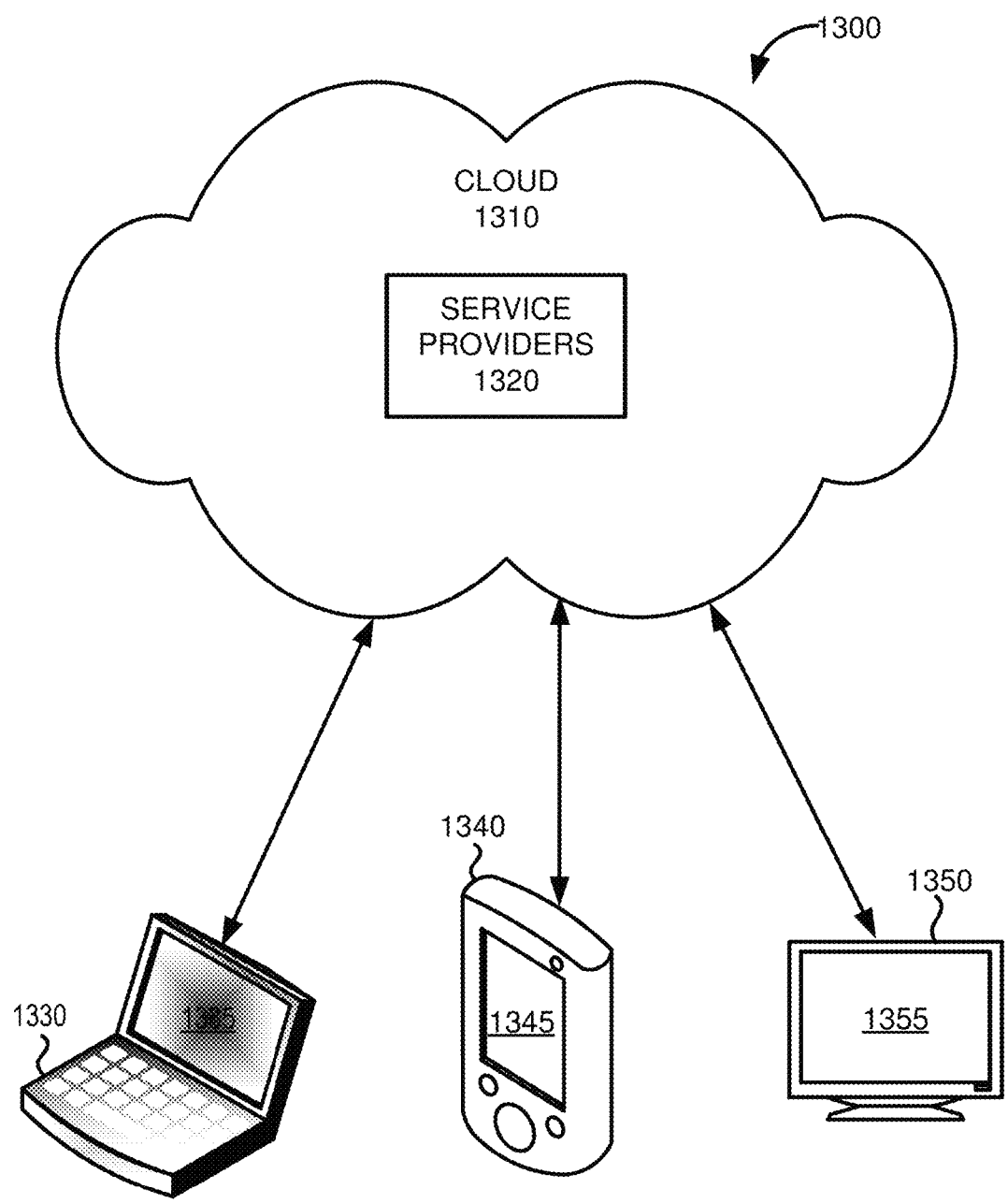
FIG. 13 is an example cloud-support environment that can be used in conjunction with the technologies described herein.

FIG. 13 is an example cloud-support environment that can be used in conjunction with the technologies described herein. In example environment 1300, the cloud 1310 provides services for connected devices 1330, 1340, 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. Connected device 1340 represents a device with a mobile device screen 1345 (e.g., a small size screen). For example, connected device 1340 could be a mobile phone, smart phone, personal digital assistant, tablet computer, and the like. Connected device 1350 represents a device with a large screen 1355. For example, connected device 1350 could be a television screen (e.g., a smart television) or another device connected to a television (e.g., a set-top box or gaming console) or the like. One or more of the connected devices 1330, 1340, 1350 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through cloud service providers 1320, or through other providers of online services (not depicted). For example, cloud services can be customized to the screen size, display capability, and/or touch screen capability of a particular connected device (e.g., connected devices 1330, 1340, 1350).

In example environment 1300, the cloud 1310 provides the technologies and solutions described herein (including one or more (including all) of the subcomponents of the image analysis component 1105 of FIG. 11) to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users).

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of computing languages, including programming languages, markup languages, or combinations thereof.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

While this invention has been particularly shown and described with references to example embodiments thereof, it will be understood by those skilled in the art that various changes in form and details may be made therein without departing from the scope of the invention encompassed by the appended claims.

What is claimed is:

1. In a computing system, a method for training a machine learning software component comprising:
    receiving a plurality of images;
    receiving a plurality of location tuples, each of the location tuples comprising a subject identifier and a temporal identifier;
    for each of the plurality of location tuples, associating the subject identifier for that location tuple with an image of the plurality of images using the temporal identifier for that location tuple to provide a training data set, wherein the training data set comprises a plurality of members, each of the plurality of members comprising an image, at least one subject identifier, at least one temporal identifier or timestamp, and at least one supplemental scoring parameter; and
    training the machine learning software component with the training data set.

2. The method of claim 1, wherein the temporal identifier indicates a time at which an individual indicated by the subject identifier of the location tuple was located proximate a particular location.

3. The method of claim 2, wherein the time is obtained from a RFID tag associated with the individual.

4. The method of claim 2, wherein the particular location is a finish line of a race.

5. The method of claim 2, wherein the particular location is a location on a race course.

6. The method of claim 1, wherein the supplemental scoring parameter comprises performance data associated with one of the at least one subject identifiers.

7. The method of claim 1, wherein the supplemental scoring parameter comprises pace data associated with one of the at least one subject identifiers.

8. The method of claim 1, wherein the supplemental scoring parameter comprises a visually distinct feature associated with one of the at least one subject identifiers.

9. The method of claim 8, wherein the visually distinct feature comprises a bib number.

10. The method of claim 8, wherein the visually distinct feature comprises a clothing item and its color.

11. The method of claim 8, wherein the visually distinct feature comprises a logo.

12. The method of claim 1, wherein the machine learning software component comprises an artificial neural network.

13. A computing system comprising a processor and memory, the computing system being configured to perform the method of claim 1.

14. One or more computer-readable media having stored thereon computer-executable instructions for causing a computer system programmed thereby to perform the method of claim 1.

* * * * *